(12) United States Patent
Cheng et al.

(10) Patent No.: US 8,871,293 B2
(45) Date of Patent: *Oct. 28, 2014

(54) METHOD FOR MAKING TOUCH PANEL

(75) Inventors: Jia-Shyong Cheng, New Taipei (TW);
Po-Shan Huang, New Taipei (TW);
Po-Sheng Shih, New Taipei (TW);
Chun-Yi Hu, New Taipei (TW);
Chih-Han Chao, New Taipei (TW);
Jeah-Sheng Wu, New Taipei (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 361 days.

This patent is subject to a terminal disclaimer.

(21) Appl. No.: 13/339,658

(22) Filed: Dec. 29, 2011

(65) Prior Publication Data

US 2012/0312771 A1   Dec. 13, 2012

(30) Foreign Application Priority Data

Jun. 9, 2011  (TW) ................................. 100120143

(51) Int. Cl.
*B05D 5/12* (2006.01)
*C08F 2/48* (2006.01)
*G06F 3/045* (2006.01)
*H01B 13/00* (2006.01)
*C08J 7/04* (2006.01)
*B82Y 30/00* (2011.01)

(52) U.S. Cl.
CPC ... *B05D 5/12* (2013.01); *C08F 2/48* (2013.01); *G06F 3/045* (2013.01); *G06F 2203/04103* (2013.01); *H01B 13/00* (2013.01); *C08J 7/04* (2013.01); *B82Y 30/00* (2013.01)

USPC ............................................. 427/112; 427/58

(58) Field of Classification Search
CPC ......... C23C 14/00; H01B 13/00; B32B 37/14
USPC ............. 427/372.2, 58, 419.2, 108, 508, 510;
428/1.1; 345/173, 174, 175, 176, 177,
345/178; 977/742, 952
See application file for complete search history.

(56) References Cited

U.S. PATENT DOCUMENTS

| 6,842,171 | B2 | 1/2005 | Richter et al. |
| 8,199,118 | B2 | 6/2012 | Pennington et al. |
| 2004/0099438 | A1 | 5/2004 | Arthur et al. |
| 2005/0046622 | A1 | 3/2005 | Nakanishi et al. |

(Continued)

FOREIGN PATENT DOCUMENTS

| CN | 1671481 | 9/2005 |
| CN | 1918538 | 2/2007 |

(Continued)

*Primary Examiner* — Michael Cleveland
*Assistant Examiner* — Tabassom Tadayyon Eslami
(74) *Attorney, Agent, or Firm* — Novak Druce Connolly Bove + Quigg LLP

(57) ABSTRACT

The present disclosure relates to a method for making touch panel. A substrate having a surface is provided. The substrate defines two areas: a touch-view area and a trace area. An adhesive layer is formed on the surface of the substrate. The adhesive layer on the trace area is solidified. A carbon nanotube layer is formed on the adhesive layer. The adhesive layer on the touch-view area is solidified. The carbon nanotube layer on the trace area is removed. At least one electrode and a conductive trace is formed.

18 Claims, 12 Drawing Sheets

(56) References Cited

U.S. PATENT DOCUMENTS

| | | |
|---|---|---|
| 2005/0126831 A1 | 6/2005 | Richter et al. |
| 2005/0275415 A1 | 12/2005 | Sato et al. |
| 2008/0129317 A1 | 6/2008 | Oba |
| 2009/0159188 A1 | 6/2009 | Jiang et al. |
| 2010/0093247 A1* | 4/2010 | Jiang et al. .................. 445/24 |
| 2010/0271330 A1 | 10/2010 | Philipp |
| 2011/0018424 A1 | 1/2011 | Takada |
| 2011/0050636 A1 | 3/2011 | Nagata et al. |
| 2011/0095770 A1 | 4/2011 | Kurashima |
| 2012/0211264 A1 | 8/2012 | Milne |
| 2012/0312776 A1* | 12/2012 | Cheng et al. .................. 216/20 |

FOREIGN PATENT DOCUMENTS

| | | |
|---|---|---|
| CN | 101464763 | 6/2009 |
| CN | 101593066 | 12/2009 |
| JP | 2011-95806 | 5/2011 |
| TW | 200912721 | 3/2009 |
| TW | 201115442 | 5/2011 |

* cited by examiner

METHOD FOR MAKING TOUCH PANEL

CROSS-REFERENCE TO RELATED APPLICATIONS

This application claims all benefits accruing under 35 U.S.C. §119 from Taiwan Patent Application No. 100120143, filed on Jun. 9, 2011, in the Taiwan Intellectual Property Office, the contents of which are hereby incorporated by reference. This application is related to applications entitled, "TOUCH PANEL", filed on Dec. 29, 2011, with application Ser. No. 13/339,643; and "METHOD FOR MAKING TOUCH PANEL", filed on Dec. 29, 2011, with application Ser. No. 13/339,664; and "PATTERNED CONDUCTIVE ELEMENT", filed on Dec. 29, 2011, with application Ser. No. 13/339,671 now U.S. Pat. No. 8,623,163; and "TOUCH PANEL AND METHOD FOR MAKING THE SAME", filed on Dec. 29, 2011, with application Ser. No. 13/339,678; and "METHOD FOR MAKING TOUCH PANEL", filed on Dec. 29, 2011, with application Ser. No. 13/339,681; and "METHOD FOR MAKING TOUCH PANEL", filed on Dec. 29, 2011, with application Ser. No. 13/339,688; and "TOUCH PANEL", filed on Dec. 29, 2011, with application Ser. No. 13/339,696; and "METHOD FOR MAKING PATTERNED CONDUCTIVE ELEMENT", filed on Dec. 29, 2011, with application Ser. No. 13/339,700 now U.S. Pat. No. 8,454,787; and "METHOD FOR MAKING PATTERNED CONDUCTIVE ELEMENT", filed on Dec. 29, 2011, with application Ser. No. 13/339,703 now U.S. Pat. No. 8,623,244; and "TOUCH PANEL", filed on Dec. 29, 2011, with application Ser. No. 13/339,709; and "TOUCH PANEL", filed on Dec. 29, 2011, with application Ser. No. 13/339,718.

BACKGROUND

1. Technical Field

The present disclosure relates to touch panels and method for making the same, particularly, to a carbon nanotube based touch panel and a method for making the same.

2. Description of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel. Thus a demand exists for such touch panels which superior in visibility and reliable in operation. Due to a higher accuracy and a low-cost of the production, the resistance-type touch panels have been widely used.

A conventional resistance-type or capacitance-type touch panel includes a conductive indium tin oxide (ITO) layer as an optically transparent conductive layer. However, the ITO layer is generally formed by means of ion-beam sputtering and etched by laser beam, and the method is relatively complicated. Furthermore, the ITO layer has poor wearability, low chemical endurance and uneven resistance in an entire area of the panel. Additionally, the ITO layer has a relatively low transparency. All the above-mentioned problems of the ITO layer produce a touch panel with low sensitivity, accuracy, and brightness.

What is needed, therefore, is to provide a touch panel and a method for making the same which can overcome the shortcoming described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present touch panels and method for making the same.

Figure 1:
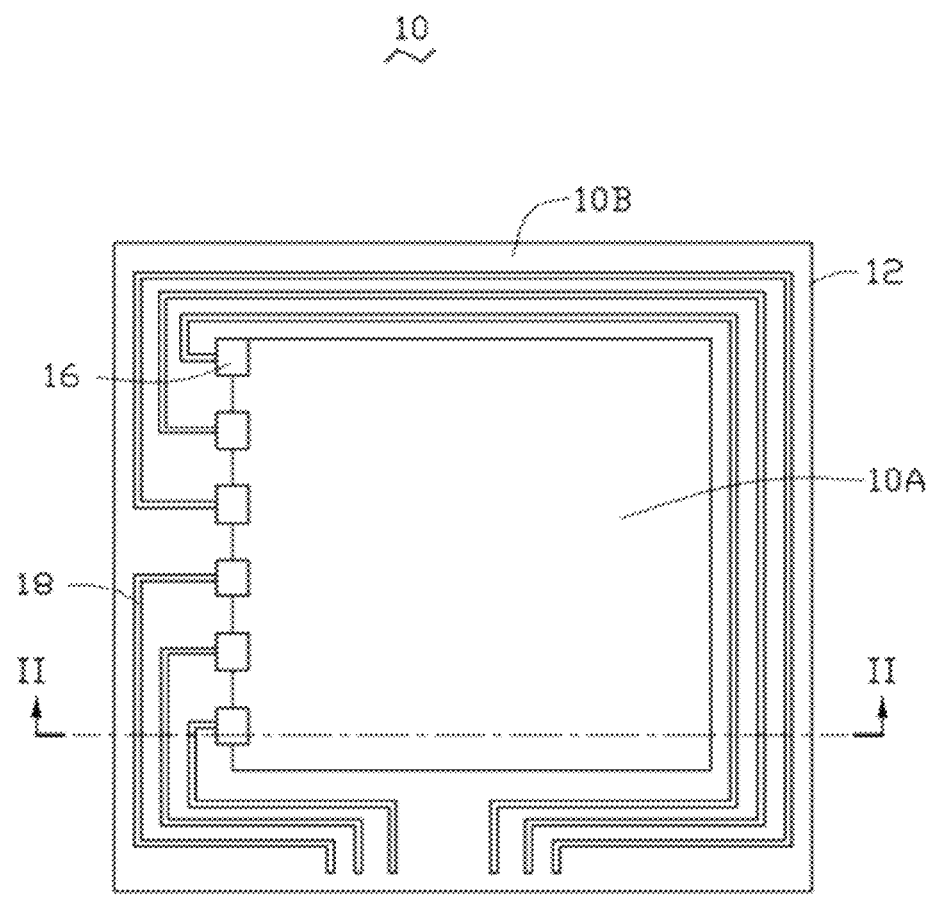
FIG. 1 is a schematic, top view of one embodiment of a touch panel.
Figure 2:
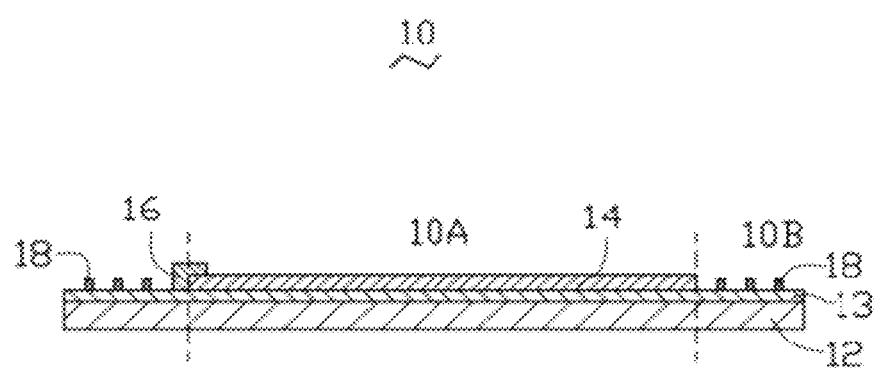
FIG. 2 is a schematic, cross-sectional view, along a line II-II of FIG. 1.

Referring to FIGS. 1 and 2, a touch panel 10 of one embodiment includes a substrate 12, a transparent conductive layer 14, at least one electrode 16, and a conductive trace 18.

The touch panel 10 defines two areas: a touch-view area 10A and a trace area 10B. The touch-view area 10A is typically a center area of the touch panel 10 which can be touched and viewed to realize the control function. The trace area 10B is usually a periphery area of the touch panel 10 which can be used to support the conductive trace 18. The touch-view area 10A has a relatively large area. The trace area 10B is located on at least one side of the touch-view area 10A. The positional relationship of the touch-view area 10A and the trace area 10B can be selected according to need. In one embodiment, the shape of the touch panel 10 is a rectangle, and the positional relationship of the touch-view area 10A and the trace area 10B is given as below.

Figure 3:
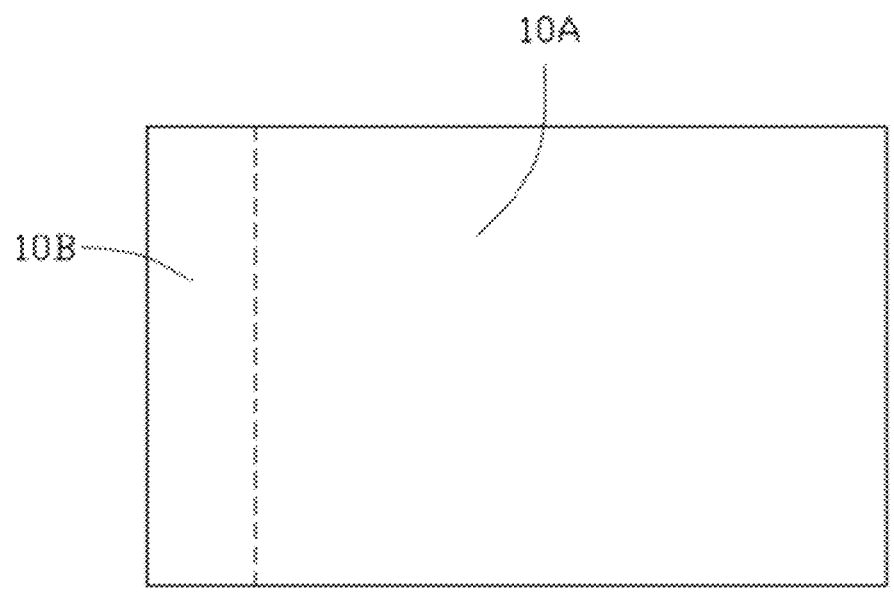
FIGS. 3-6 show different positional relationship of a touch-view area and a trace area.
Figure 4:
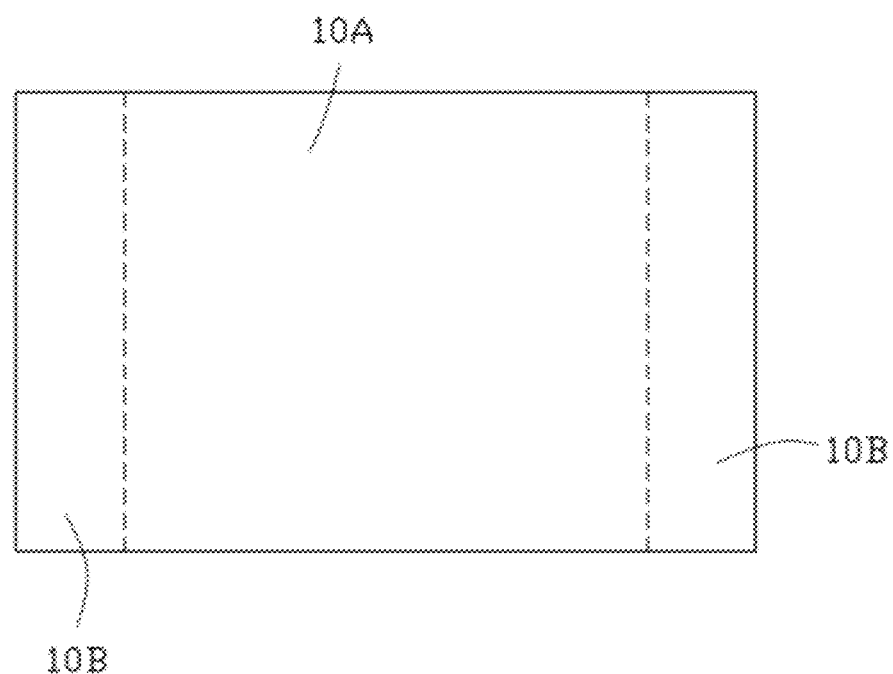
Figure 5:
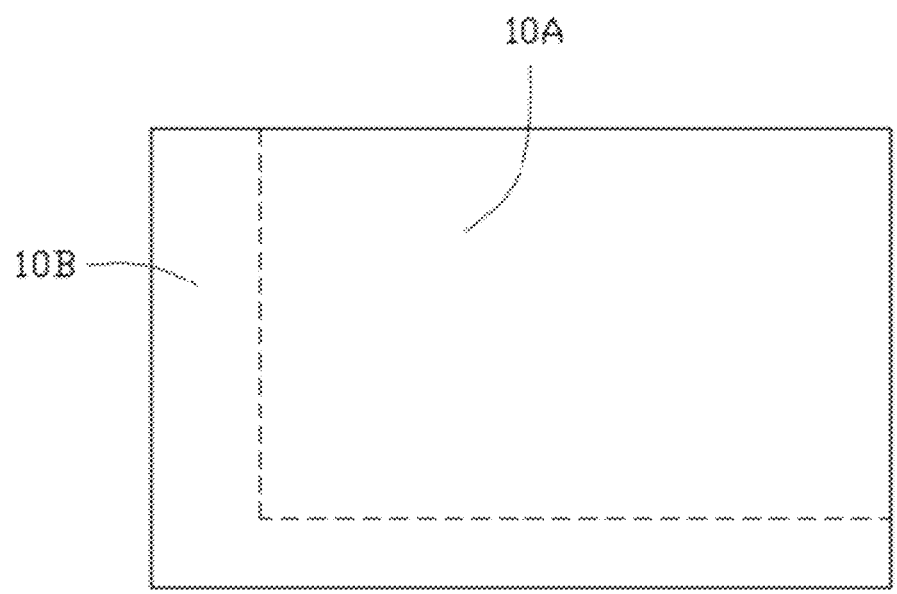
Figure 6:
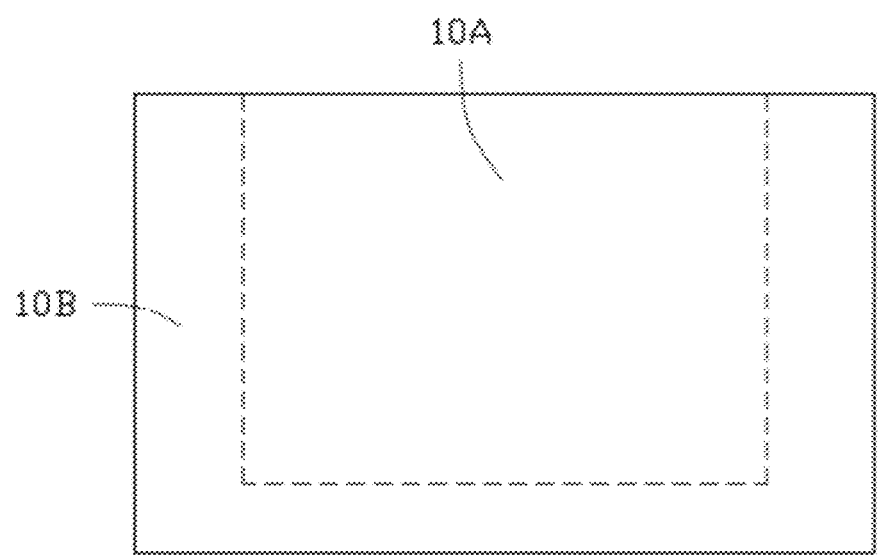

Referring to FIG. 1, the trace area 10B is an annular region on the periphery, and the touch-view area 10A is a square region on the center and surrounded by the trace area 10B. Referring to FIG. 3, the trace area 10B is a strip-shaped region on one side of the touch panel 10, and the touch-view area 10A is rest of the touch panel 10 except the trace area 10B. Referring to FIG. 4, the trace areas 10B are two strip-shaped regions on opposite sides of the touch panel 10, and the touch-view area 10A is the region between the trace areas 10B. Referring to FIG. 5, the trace area 10B is an L-shaped region on adjacent two sides of the touch panel 10, and the touch-view area 10A is the other region except the trace area 10B. Referring to FIG. 6, the trace area 10B is a U-shaped region on three adjacent sides of the touch panel 10, and the touch-view area 10A is the other region except the trace area 10B. In one embodiment, the touch-view area 10A is the center region having a shape the same as that is the shape of touch panel 10 and surrounded by the trace area 10B.

The transparent conductive layer 14, the at least one electrode 16, and the conductive trace 18 are located on a surface of the substrate 12. The transparent conductive layer 14 is located only on the touch-view area 10A. The conductive trace 18 is located only on the trace area 10B. Thus, the conductive trace 18 and the transparent conductive layer 14 do not overlap. The at least one electrode 16 is located on at least one side of the transparent conductive layer 14 and electrically connected with the transparent conductive layer 14 and the conductive trace 18. The conductive trace 18 is electrically connected with an external circuit. Because the conductive trace 18 and the transparent conductive layer 14 have no overlapping part, no capacitance signal interference will be produced between the transparent conductive layer 14 and the conductive trace 18 when the touch-view area 10A is touched by a finger or a stylus. Thus, the accuracy of the touch panel 10 is improved.

The substrate 12 can be flat or curved and configured to support other elements. The substrate 12 is insulative and transparent. The substrate 12 can be made of rigid materials such as glass, quartz, diamond, plastic or any other suitable material. The substrate 12 can also be made of flexible materials such as polycarbonate (PC), polymethyl methacrylate acrylic (PMMA), polyimide (PI), polyethylene terephthalate (PET), polyethylene (PE), polyether polysulfones (PES), polyvinyl polychloride (PVC), benzocyclobutenes (BCB), polyesters, or acrylic resin. In one embodiment, the substrate 12 is a flat and flexible PET plate.

The transparent conductive layer 14 includes a carbon nanotube film. The carbon nanotube film includes a plurality of carbon nanotubes. The carbon nanotube film can be a substantially pure structure of the carbon nanotubes, with few impurities and chemical functional groups. A majority of the carbon nanotubes are arranged to extend along the direction substantially parallel to the surface of the carbon nanotube film. The carbon nanotubes in the carbon nanotube film can be single-walled, double-walled, or multi-walled carbon nanotubes. The length and diameter of the carbon nanotubes can be selected according to need, for example the diameter can be in a range from about 0.5 nanometers to about 50 nanometers and the length can be in a range from about 200 nanometers to about 900 nanometers. The thickness of the carbon nanotube film can be in a range from about 0.5 nanometers to about 100 micrometers, for example in a range from about 100 nanometers to about 200 nanometers. The carbon nanotube film has a good flexibility because of the good flexibility of the carbon nanotubes therein.

The carbon nanotubes of the carbon nanotube film can be arranged orderly to form an ordered carbon nanotube structure or disorderly to form a disordered carbon nanotube structure. The term 'disordered carbon nanotube structure' includes, but is not limited to, to a structure where the carbon nanotubes are arranged along many different directions, and the aligning directions of the carbon nanotubes are random. The number of the carbon nanotubes arranged along each different direction can be almost the same (e.g. uniformly disordered). The carbon nanotubes in the disordered carbon nanotube structure can be entangled with each other. The term 'ordered carbon nanotube structure' includes, but is not limited to, to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions).

In one embodiment, the carbon nanotube film is a free-standing structure. The term "free-standing structure" means that the carbon nanotube film can sustain the weight of itself when it is hoisted by a portion thereof without any significant damage to its structural integrity. Thus, the carbon nanotube film can be suspended by two spaced supports. The free-standing carbon nanotube film can be laid on the epitaxial growth surface 101 directly and easily.

Figure 7:
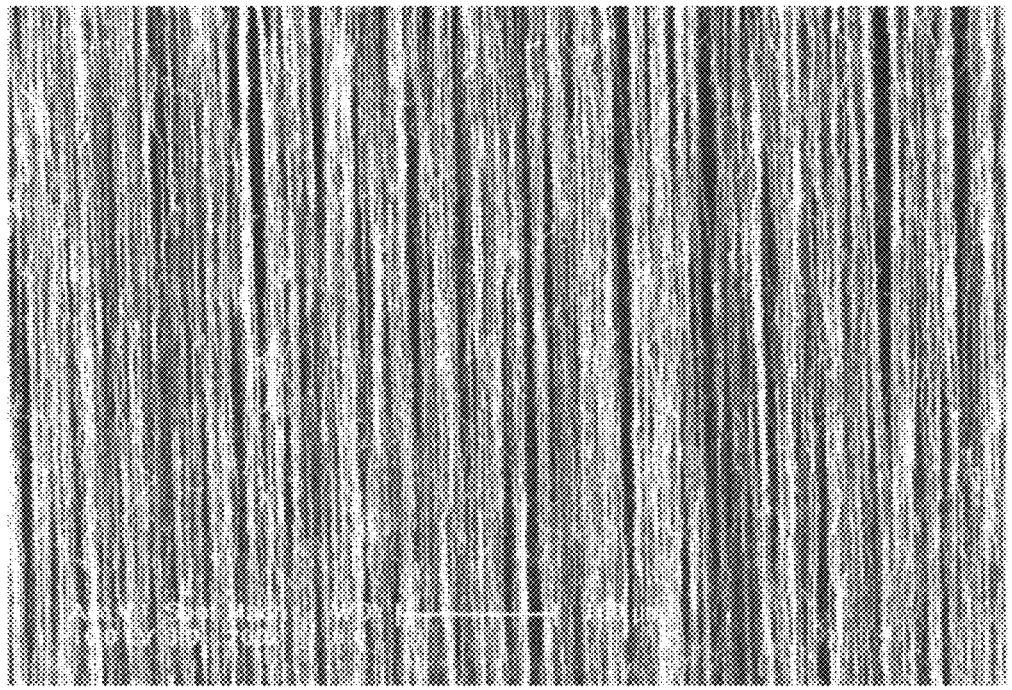
FIG. 7 is a Scanning Electron Microscope (SEM) image of a carbon nanotube film.

In one embodiment, the transparent conductive layer 14 is a single carbon nanotube film. The carbon nanotube film includes a plurality of successive and oriented carbon nanotubes joined end-to-end by van der Waals attractive force therebetween. The carbon nanotube film is a free-standing film. Referring to FIG. 7, each carbon nanotube film includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. Some variations can occur in the carbon nanotube film. The carbon nanotubes in the carbon nanotube film are oriented along a preferred orientation. The carbon nanotube film can be treated with an organic solvent to increase the mechanical strength and toughness and reduce the coefficient of friction of the carbon nanotube film. A thickness of the carbon nanotube film can range from about 0.5 nanometers to about 100 micrometers.

The transparent conductive layer 14 can include at least two stacked carbon nanotube films. In other embodiments, the transparent conductive layer 14 can include two or more coplanar carbon nanotube films. Additionally, when the carbon nanotubes in the carbon nanotube film are aligned along one preferred orientation, an angle can exist between the orientation of carbon nanotubes in adjacent films, whether stacked or adjacent. Adjacent carbon nanotube films can be combined by only the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked carbon nanotube films is larger than 0 degrees, a plurality of micropores is defined by the carbon nanotube film. Stacking the carbon nanotube films will also add to the structural integrity of the carbon nanotube film.

The carbon nanotube film can be made by the steps of: growing a carbon nanotube array on a wafer by chemical vapor deposition method; and drawing the carbon nanotubes of the carbon nanotube array to from the carbon nanotube film. During the drawing step, the carbon nanotubes are joined end-to-end by van der Waals attractive force therebetween along the drawing direction. The carbon nanotube film has the smallest resistance along the drawing direction and the greatest resistance along a direction perpendicular to the drawing direction. Thus, the carbon nanotube film is resistance anisotropy. Furthermore, the carbon nanotube film can be etched or irradiated by laser. After being irradiated by laser, a plurality of parallel carbon nanotube conductive strings will be formed and the resistance anisotropy of the carbon nanotube film will not be damaged because the carbon nanotube substantially extending not along the drawing direction are removed by burning. Each carbon nanotube conductive string comprises a plurality of carbon nanotubes joined end-to-end by van der Waals attractive force.

The carbon nanotube film can be located on the substrate 12 directly and adhered to the substrate 12 by an adhesive layer 13. The adhesive layer 13 is configured to fix the carbon nanotube film on the substrate 12. The adhesive layer 13 can be transparent, opaque, or translucent. In one embodiment, the transmittance of the adhesive layer 13 can be greater than 75%. The adhesive layer 13 can be made of materials such as hot plastic or UV (Ultraviolet Rays) glue, for example PVC or PMMA. The thickness of the adhesive layer 13 can be in a range from about 1 nanometer to about 500 micrometers, for example, the thickness is in a range from about 1 micrometer to about 2 micrometers. In one embodiment, the adhesive layer 13 is a UV glue layer with a thickness of 1.5 micrometers.

The electrode 16 can be located on a surface of the substrate 12. The electrode 16 can be located on only the touch-view area 10A, only the trace area 10B, or both the touch-view area 10A and the trace area 10B. The position of the electrode 16 depends on the work principle of the touch-point 10 and the detection methods of the touch-point. The number of the electrode 16 depends on the area and resolution of the touch panel 10. In one embodiment, the touch panel 10 includes six electrodes 16 spaced from each other, arranged on one side of the transparent conductive layer 14. The electrodes 16 can be made of material such as metal, carbon nanotube, conductive silver paste, or ITO. The electrodes 16 can be made by etching a metal film, etching an ITO film, or printing a conductive silver paste.

The conductive trace 18 includes a plurality of conductive wires. The conductive trace 18 can be made of material such as metal, carbon nanotube, conductive silver paste, or ITO. The conductive trace 18 can be made by etching a metal film, etching an ITO film, or printing a conductive silver paste. In one embodiment, both the conductive trace 18 and the electrodes 16 are made of conductive silver paste and made by printing conductive silver paste concurrently.

Figure 8:
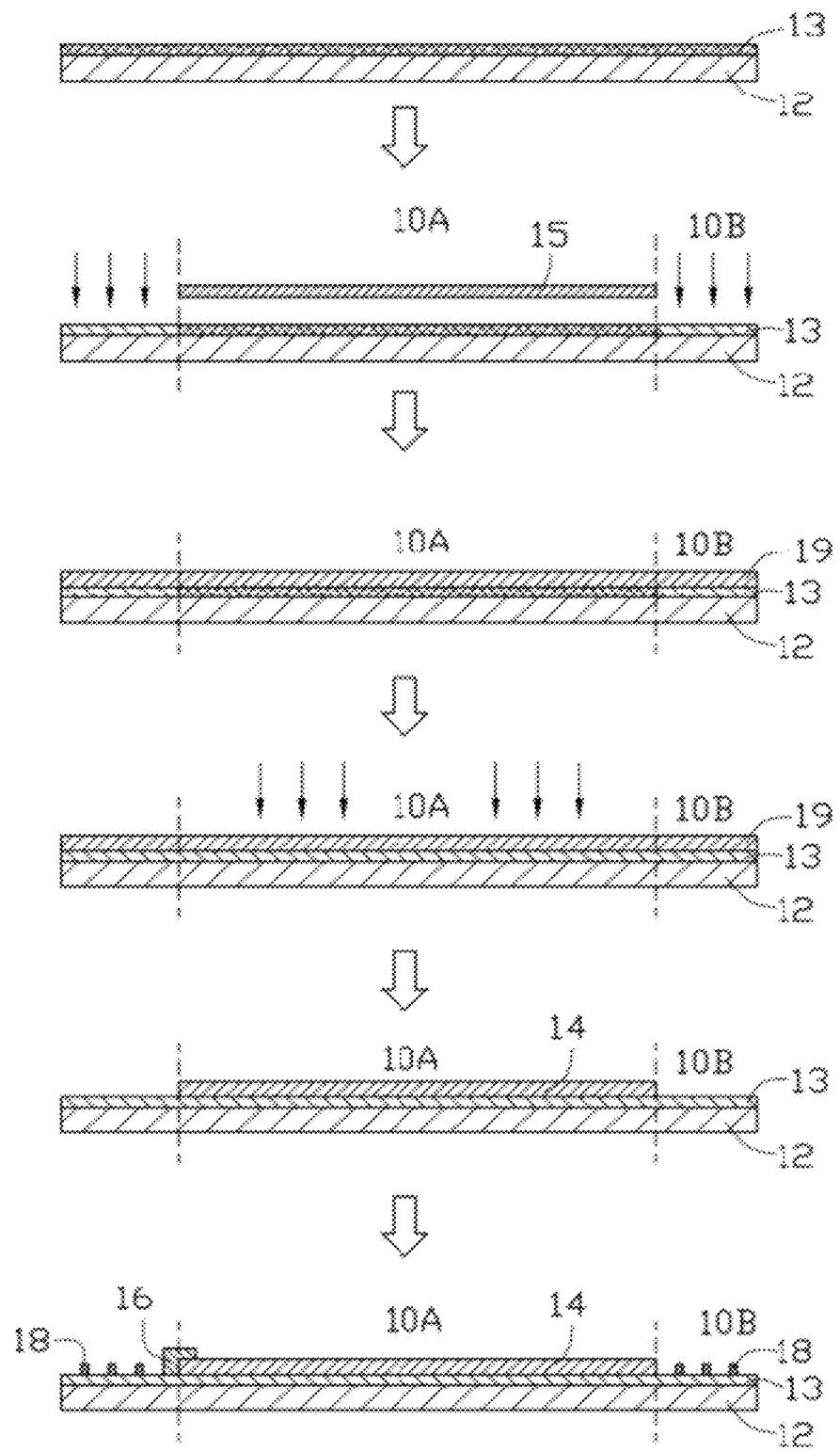
FIG. 8 is a flowchart of one embodiment of a method for making a touch panel.

Referring to FIG. 8, a method for making the touch panel 10 of one embodiment includes the steps of:

step (S10), applying an adhesive layer 13 on a surface of the substrate 12, wherein the substrate 12 defines two areas: a touch-view area 10A and a trace area 10B;

step (S20), solidifying the adhesive layer 13 on the trace area 10B;

step (S30), placing a carbon nanotube film 19 on the adhesive layer 13;

step (S40), solidifying the adhesive layer 13 on the touch-view area 10A to fix the carbon nanotube film 19 on the substrate 12;

step (S50), removing the carbon nanotube film 19 on the trace area 10B to obtain a transparent conductive layer 14; and step (S60), forming the electrode 16 and the conductive trace 18.

In step (S10), the touch-view area 10A and the trace area 10B can be defined by the way as shown in FIGS. 3-6. The adhesive layer 13 can be any adhesive which can be solidified on a certain condition. The adhesive layer 13 is transparent and can be made of materials such as hot plastic or UV glue, for example PVC or PMMA. The adhesive layer 13 can be formed by spin-coating, spraying, or brushing. In one embodiment, the substrate 12 is a PET film. A UV glue layer with a thickness of 1.5 micrometers is formed on the substrate 12 by spin-coating.

In step (S20), the method for solidifying the adhesive layer 13 depends on the material of the adhesive layer 13. The thermoplastic adhesive layer 13 can be solidified by partially cooling, the thermosetting adhesive layer 13 can be solidified by partially heating, and the UV glue adhesive layer 13 can be solidified by partially irradiating with ultraviolet light.

In one embodiment, the adhesive layer 13 is UV glue layer and can be solidified by steps of:

step (S201), sheltering the adhesive layer 13 on the touch-view area 10A by a mask 15, wherein the mask 15 can be suspended above the adhesive layer 13;

step (S202), irradiating the adhesive layer 13 on the trace area 10B with ultraviolet light, wherein the adhesive layer 13 is irradiated for about 2 seconds to about 30 seconds; and step (S203), removing the mask 15.

In step (S30), the carbon nanotube film 19 can be formed by transfer printing a preformed carbon nanotube film, filtering and depositing a carbon nanotube suspension, or laying a free-standing carbon nanotube film. In one embodiment, the carbon nanotube film 19 is drawn from a carbon nanotube array and then placed on the adhesive layer 13 directly. After the carbon nanotube film 19 is placed on the adhesive layer 13, the carbon nanotube film 19 on the trace area 10B is only located on surface of the solidified adhesive layer 13 and connected with the solidified adhesive layer 13 by van der Waals attractive force. The carbon nanotube film 19 on the touch-view area 10A is infiltrated into the non-solidified adhesive layer 13 and will be fixed by the adhesive layer 13 in following step (S40). In one embodiment, part of the carbon nanotube film 19 on the touch-view area 10A is infiltrated into the non-solidified adhesive layer 13, and part of the carbon nanotube film 19 on the touch-view area 10A is exposed through of the adhesive layer 13. Furthermore, a step of pressing the carbon nanotube film 19 can be performed after step (S30) to allow more carbon nanotubes of the carbon nanotube film 19 to infiltrate into the non-solidified adhesive layer 13.

In step (S40), the method for solidifying the adhesive layer 13 is same as the method for solidifying the adhesive layer 13 provided in step (S20). The non-solidified adhesive layer 13 is solidified in step (S40). Because part of the carbon nanotube film 19 is infiltrated into the non-solidified adhesive layer 13, the carbon nanotube film 19 on the touch-view area 10A is fixed by the adhesive layer 13 in step (S40). The carbon nanotube film 19 on the trace area 10B will not be fixed by the adhesive layer 13. In one embodiment, the adhesive layer 13 on the touch-view area 10A is solidified by irradiating with ultraviolet light.

In step (S50), the carbon nanotube film 19 on the trace area 10B can be removed by a method such as stripping by an adhesive tape or peeling by a roller having an adhesive outer surface. Because the bonding force between the carbon nanotube film 19 and the adhesive layer 13 on the trace area 10B is weak, the carbon nanotube film 19 on the trace area 10B will be removed easily by the adhesive tape or the roller having an adhesive outer surface. In one embodiment, the carbon nanotube film 19 on the trace area 10B is stripped by an adhesive tape. Compared to the process of forming ITO layer by ion-beam sputtering and etching ITO layer by laser beam, the process of making the transparent conductive layer 14 is simple and low cost. Furthermore, the carbon nanotube film 19 can be removed by a method such as laser-beam etching, ion-beam etching, or electron-beam etching.

In step (S60), the electrode 16 and the conductive trace 18 can be made by a method such as screen printing, chemical vapor deposition, or magnetron sputtering. In one embodiment, the electrode 16 and the conductive trace 18 are formed concurrently by printing conductive silver paste. The conductive silver paste can include about 50% to about 90% (by weight) of the metal powder, about 2% to about 10% (by weight) of the glass powder, and about 8% to about 40% (by weight) of the binder.

In one embodiment, the order of the step (S50) and step (S60) is interchangeable. Thus, the conductive trace 18 is formed on and covers the carbon nanotube film 19. In this way, the carbon nanotube film 19 is removed by a method such as laser-beam etching, ion-beam etching, or electron-beam etching. The conductive trace 18 can be used as a mask for etching. Thus, part of the carbon nanotube film 19 will be maintained between the conductive trace 18 and the adhesive layer 13 or between the electrode 16 and the adhesive layer 13.

Furthermore, an optically clear adhesive (OCA) layer and a cover lens can be applied on the touch panel 10 to cover the transparent conductive layer 14, the at least one electrode 16, and the conductive trace 18. Thus, a touch screen is obtained.

Figure 9:
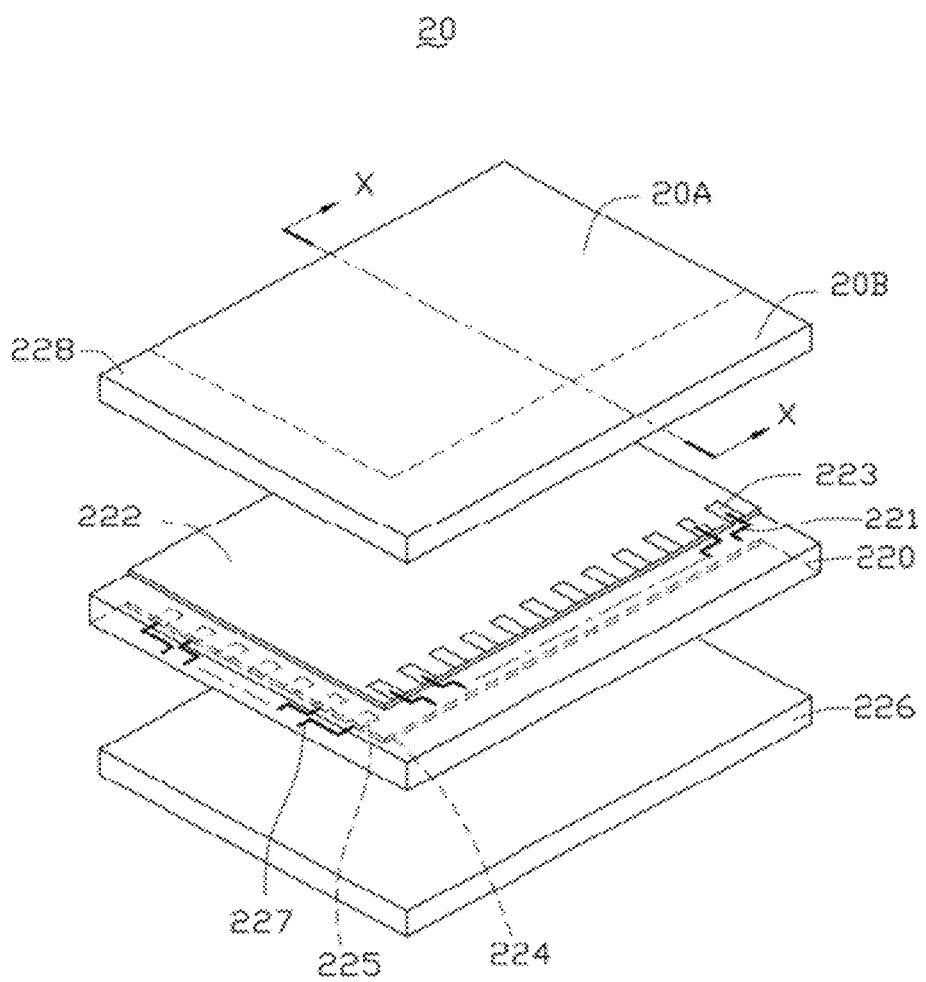
FIG. 9 is a schematic view of one embodiment of a touch panel.
Figure 10:
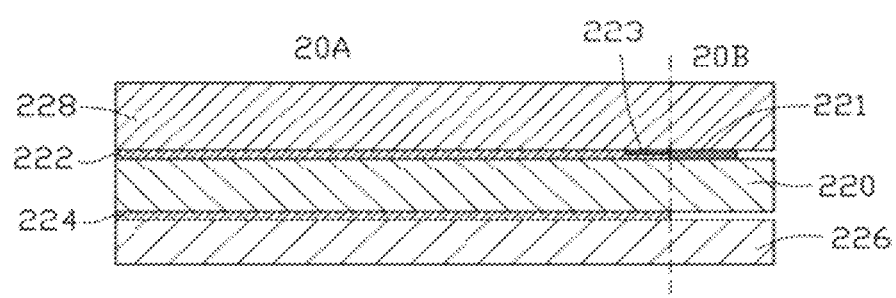
FIG. 10 is a schematic, cross-sectional view, along a line X-X of FIG. 9.

Referring to FIGS. 9 and 10, a capacitance-type touch panel 20 of one embodiment includes a first substrate 226, a second substrate 220, a third substrate 228, a first transparent conductive layer 222, a second transparent conductive layer 224, a plurality of first electrodes 223, a plurality of second electrodes 225, a first conductive trace 221, and a second conductive trace 227.

The touch panel 20 defines two areas: a touch-view area 20A and a trace area 20B. In one embodiment, the touch panel 20 is rectangular, the trace area 20B is an L-shaped region on adjacent two sides of the touch panel 20, and the touch-view area 20A is the other region except the trace area 20B.

The first substrate 226, the second transparent conductive layer 224, the second substrate 220, the first transparent conductive layer 222, and the third substrate 228 are stacked with each other on that order. The first transparent conductive layer 222 and the second transparent conductive layer 224 are located on two opposite surfaces of the second substrate 220. The first substrate 226 is located on and covers the second transparent conductive layer 224. The third substrate 228 is located on and covers the first transparent conductive layer 222. The third substrate 228 typically serves as a first side and is adjacent to the touch surface. The first substrate 226 typically serves as a second side and is far away from the touch surface. The first electrodes 223 are spaced from each other and electrically connected to the first transparent conductive layer 222. The second electrodes 225 are spaced from each other and electrically connected to the second transparent conductive layer 224. Furthermore, other function layers can be inserted into the touch panel 20 according to need.

The first transparent conductive layer 222 and the second transparent conductive layer 224 are located only on the touch-view area 20A. The first transparent conductive layer 222 and the second transparent conductive layer 224 are a conductive film having resistance anisotropy, such as the carbon nanotube film provided above. In one embodiment, the first transparent conductive layer 222 is a patterned ITO layer and the second transparent conductive layer 224 is a carbon nanotube film. The first transparent conductive layer 222 has the smallest resistance along an X direction parallel to the surface of the first transparent conductive layer 222. The second transparent conductive layer 224 has the smallest resistance along a Y direction parallel to the surface of the second transparent conductive layer 224. The X direction is perpendicular with the Y direction. The first electrodes 223 are arranged on a side of the first transparent conductive layer 222 and along the Y direction. The second electrodes 225 are arranged on a side of the second transparent conductive layer 224 and along the X direction.

The first conductive trace 221 and the second conductive trace 227 are located only on the trace area 20B. In one embodiment, the first conductive trace 221 and the first electrodes 223 are made of conductive silver paste and made by printing conductive silver paste concurrently. The second conductive trace 227 and the second electrodes 225 are made of conductive silver paste and made by printing conductive silver paste concurrently.

The first substrate 226, the second substrate 220, and the third substrate 228 can be flat or curved. The first substrate 226 supports other elements. The second substrate 220 insulates the first transparent conductive layer 222 and the second transparent conductive layer 224. The third substrate 228 can improve the durability and protect the first transparent conductive layer 222. In one embodiment, the first substrate 226, the second substrate 220 and the third substrate 228 are PET film. The third substrate 228 is fixed on the first transparent conductive layer 222 by an OCA layer (not shown), such as an acrylic layer.

Figure 11:
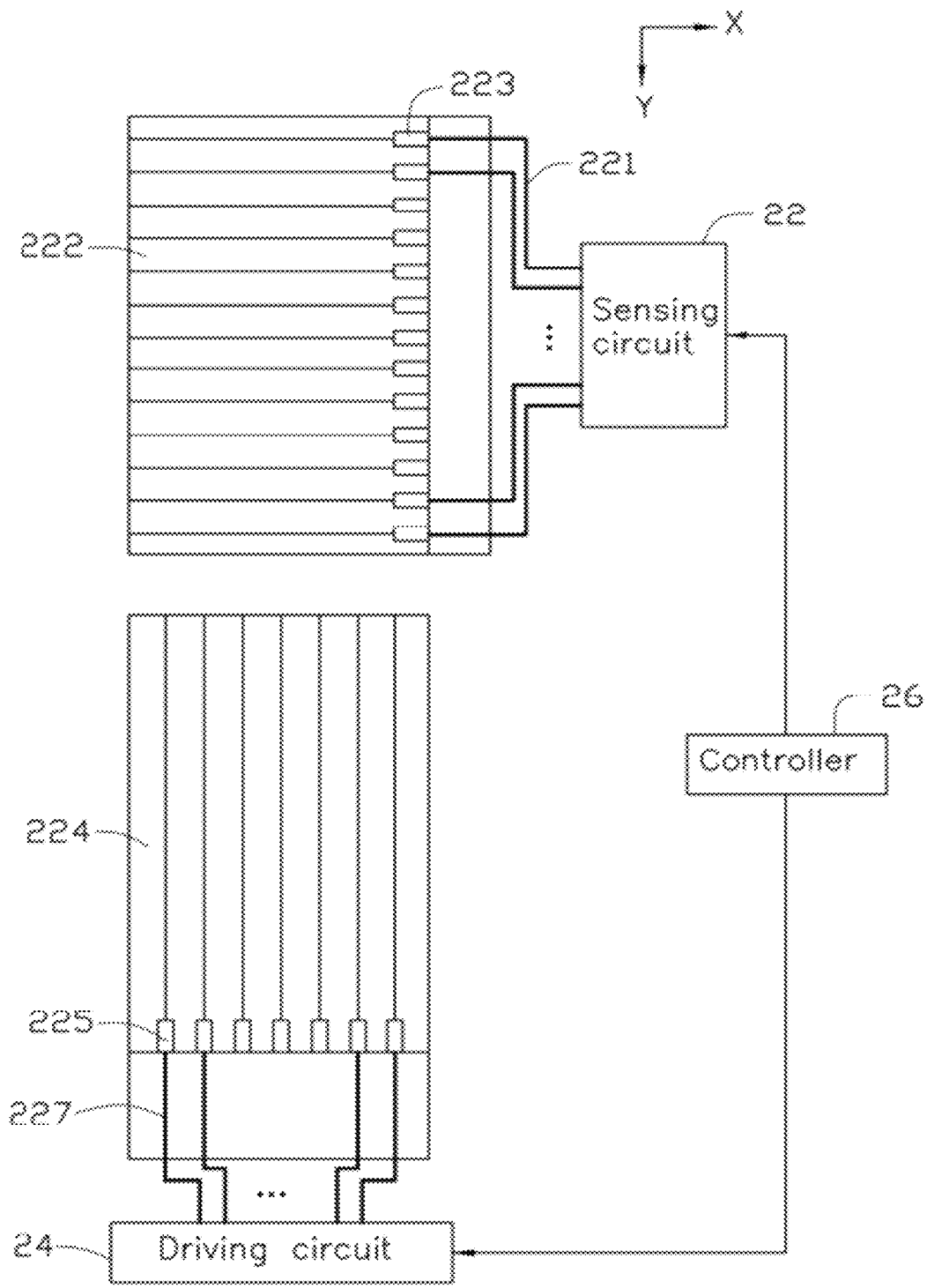
FIG. 11 is a touch-point positioning system of one embodiment of a touch panel with a first transparent conductive layer and a second transparent conductive layer separated from each other.
Figure 12:
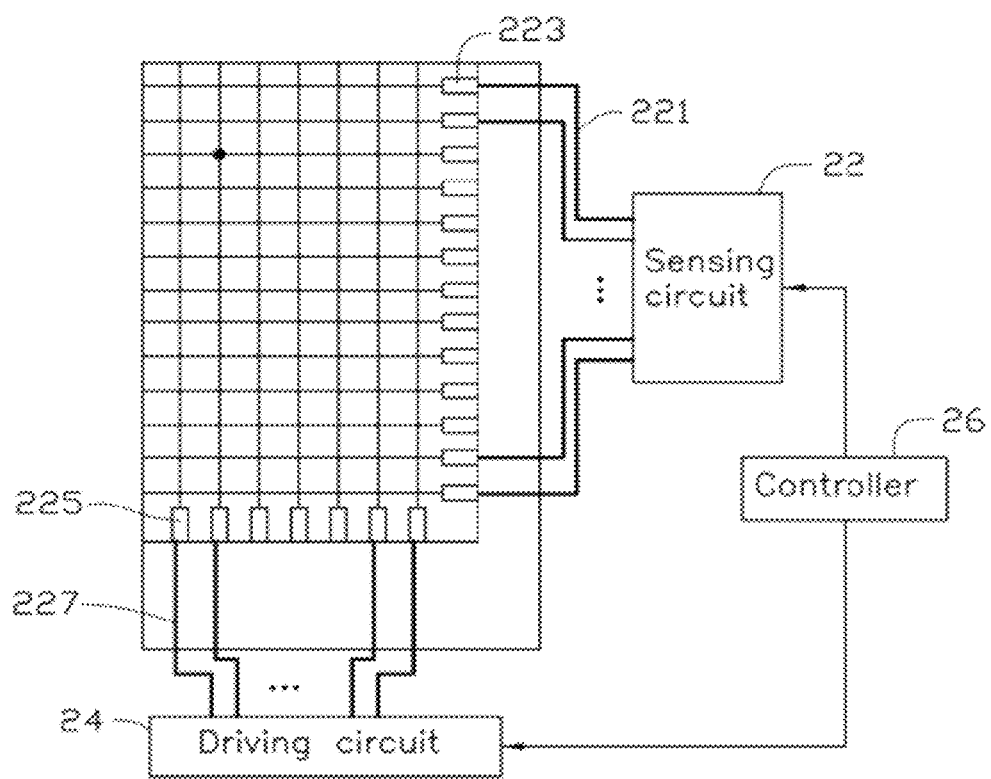
FIG. 12 is a touch-point positioning system of one embodiment of a touch panel with a first transparent conductive layer and a second transparent conductive layer stacked with each other.

Referring to FIGS. 11 and 12, a touch-point positioning system of one embodiment of the touch panel 20 is shown. The resistance along the X direction of the first transparent conductive layer 222 is the smallest. The resistance along the Y direction of the second transparent conductive layer 224 is the smallest. The first electrodes 223 are electrically connected to a sensing circuit 22 via the first conductive trace 221. The sensing circuit 22 is configured to read the sensing signals of the first electrodes 223. The second electrodes 225 are electrically connected to a driving circuit 24 via the second conductive trace 227. The driving circuit 24 is configured to input the driving signals to each of the second electrodes 225. Both the sensing circuit 22 and the driving circuit 24 are electrically connected to and controlled by a controller 26.

In one embodiment, thirteen first electrodes 223 and seven second electrodes 225 are applied as shown in FIGS. 11 and 12. When the touch panel 20 is touched by an object such as a finger or a stylus, a first capacitance C1 is produced between the first transparent conductive layer 222 and the second transparent conductive layer 224, a second capacitance C2 is produced between the first transparent conductive layer 222 and the object. The sensing signals of the first electrodes 223 will be read and processed by the sensing circuit 22 to judge the position touched by the object.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making touch panel, the method comprising:

providing a substrate having a surface, wherein the substrate defines a touch-view area and a trace area;

applying an adhesive layer on the surface of the substrate;
solidifying the adhesive layer that is on the trace area to obtain a solidified adhesive layer on the trace area and a non-solidified adhesive layer on the touch-view area;
applying a carbon nanotube film on the adhesive layer;
solidifying the adhesive layer that is on the touch-view area;
removing the carbon nanotube film from the trace area to obtain a transparent conductive layer; and
forming at least one electrode and a conductive trace on the trace area, wherein the conductive trace is electrically connected with the transparent conductive layer via the at least one electrode.

2. The method of claim 1, wherein the adhesive layer is formed by spin-coating, spraying, or brushing.

3. The method of claim 1, wherein the adhesive layer comprises thermoplastic and is solidified by cooling.

4. The method of claim 1, wherein the adhesive layer comprises thermosetting material and is solidified by heating.

5. The method of claim 1, wherein the adhesive layer comprises UV glue and is solidified by ultraviolet light irradiating.

6. The method of claim 5, wherein the solidifying the adhesive layer that is on the trace area comprising:
sheltering the adhesive layer on the touch-view area by a mask;
irradiating the adhesive layer on the trace area with ultraviolet light; and
removing the mask.

7. The method of claim 6, wherein the mask is suspended above the adhesive layer.

8. The method of claim 1, wherein the carbon nanotube film is formed by filtering and depositing a carbon nanotube suspension.

9. The method of claim 1, wherein the carbon nanotube film is a free-standing structure that is drawn from a carbon nanotube array; and the carbon nanotube film is laid on the adhesive layer directly.

10. The method of claim 1, wherein after applying the carbon nanotube film on the adhesive layer, the carbon nanotube film on the trace area is only located on a surface of the solidified adhesive layer, and the carbon nanotube film on the touch-view area is infiltrated into the non-solidified adhesive layer.

11. The method of claim 10, wherein part of the carbon nanotube film on the touch-view area is infiltrated into the non-solidified adhesive layer and part of the carbon nanotube film on the touch-view area is exposed out of the non-solidified adhesive layer.

12. The method of claim 1, further comprising pressing the carbon nanotube film after applying the carbon nanotube film on the adhesive layer.

13. The method of claim 1, wherein the carbon nanotube film on the trace area is removed by stripping by an adhesive tape or peeling by a roller having an adhesive outer surface.

14. The method of claim 1, wherein the carbon nanotube film on the trace area is removed by laser-beam etching, ion-beam etching, or electron-beam etching.

15. The method of claim 1, wherein the at least one electrode and the conductive trace are made by screen printing, chemical vapor deposition, or magnetron sputtering.

16. A method for making touch panel, the method comprising:
providing a substrate having a surface, wherein the substrate defines a touch-view area and a trace area;
applying an adhesive layer on the surface of the substrate;
solidifying the adhesive layer that is on the trace area;
applying a carbon nanotube film on the adhesive layer;
solidifying the adhesive layer that is on the touch-view area;
forming at least one electrode and a conductive trace on the trace area; and
removing the carbon nanotube film on the trace area, wherein the removing the carbon nanotube film is performed after the forming the at least one electrode and the conductive trace.

17. The method of claim 16, wherein the carbon nanotube film on the trace area is removed by laser-beam etching, ion-beam etching, or electron-beam etching.

18. A method for making touch panel, the method comprising:
providing a substrate having a surface, wherein the substrate defines a touch-view area and a trace area;
applying an UV adhesive layer on the surface of the substrate;
solidifying the UV adhesive layer that is on the trace area by ultraviolet light irradiating to obtain a solidified UV adhesive layer on the trace area and a non-solidified UV adhesive layer on the touch-view area;
applying a carbon nanotube film on the UV adhesive layer, wherein part of the carbon nanotube film on the touch-view area is infiltrated into the non-solidified UV adhesive layer;
solidifying the UV adhesive layer that is on the touch-view area by ultraviolet light irradiating;
removing the carbon nanotube film on the trace area to obtain a transparent conductive layer; and
forming at least one electrode and a conductive trace on the trace area, wherein the conductive trace is electrically connected with the with the transparent conductive layer via the at least one electrode.

* * * * *